United States Patent
Lindoff et al.

(10) Patent No.: US 8,315,571 B2
(45) Date of Patent: Nov. 20, 2012

(54) SENSING WIRELESS TRANSMISSIONS FROM A USER OF A SPECTRAL RESOURCE

(75) Inventors: Bengt Lindoff, Bjärred (SE); Johan Nilsson, Höllviken (SE); Anders Rosenqvist, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 370 days.

(21) Appl. No.: 12/625,475

(22) Filed: Nov. 24, 2009

(65) Prior Publication Data

US 2011/0124329 A1    May 26, 2011

(51) Int. Cl.
 *H04B 17/00* (2006.01)
(52) U.S. Cl. .... 455/67.11; 455/62; 455/63.1; 455/67.13
(58) Field of Classification Search .......... 455/418–420, 455/67.11, 179.1, 188.1, 450, 509, 439, 502, 455/67.13, 446, 447, 437, 522, 434; 370/445, 370/329, 341, 278, 280, 281, 343, 331, 338, 370/310, 324
See application file for complete search history.

(56) References Cited

U.S. PATENT DOCUMENTS

| | | | |
|---|---|---|---|
| 5,850,596 A | 12/1998 | Reynolds | |
| 6,832,074 B2 | 12/2004 | Borras-Chia et al. | |
| 7,027,827 B2 | 4/2006 | Bonta et al. | |
| 7,239,624 B2 | 7/2007 | Buchwald et al. | |
| 7,308,263 B2 | 12/2007 | Gallagher et al. | |
| 2003/0153273 A1 | 8/2003 | Ebert et al. | |
| 2004/0142696 A1 | 7/2004 | Saunders et al. | |
| 2005/0215260 A1 | 9/2005 | Ahya et al. | |
| 2006/0178145 A1 | 8/2006 | Floam et al. | |
| 2007/0042733 A1* | 2/2007 | Tomioka | 455/179.1 |
| 2007/0104140 A1 | 5/2007 | Ashish et al. | |
| 2009/0011788 A1 | 1/2009 | Shan et al. | |
| 2009/0075660 A1 | 3/2009 | Hallenstal et al. | |
| 2009/0111388 A1 | 4/2009 | Chen | |
| 2009/0111463 A1 | 4/2009 | Simms et al. | |
| 2009/0135744 A1 | 5/2009 | Chaudhri et al. | |
| 2009/0252178 A1* | 10/2009 | Huttunen et al. | 370/445 |

FOREIGN PATENT DOCUMENTS

JP    08233882 A    9/1996

OTHER PUBLICATIONS

Faulhaber, G. "Deploying Cognitive Radio: Economic, Legal and Policy Issues", International Journal of Communication 2 (2008), pp. 1114-1124.

(Continued)

*Primary Examiner* — Lana N Le
*Assistant Examiner* — Golam Sorowar
(74) *Attorney, Agent, or Firm* — Potomac Patent Group PLLC

(57) ABSTRACT

Wireless transmissions from a user of a spectral resource are sensed by operating receiver equipment within a user equipment to receive signals within a given bandwidth around a given carrier frequency. If the user equipment is not readily capable of analyzing the received signals to ascertain whether the signature pattern of the user is present in the received signals, then it works cooperatively with a remote unit to analyze the received signals to ascertain whether a signature pattern of the user is present in the received signals. Results of the analysis are reported to a main node. The remote unit can provide software to the user equipment and/or perform at least part of the analysis for the user equipment.

22 Claims, 5 Drawing Sheets

OTHER PUBLICATIONS

PCT International Search Report, dated Apr. 20, 2011, in connection with International Application No. PCT/EP2010/067835.

Akan, O. et al. "Cognitive radio sensor networks", IEEE Network, IEEE Service Center, New York, NY, USA, vol. 23, No. 4, Jul. 1, 2009, pp. 34-40, XP011271574, ISSN: 0890-8044, DOI: 10.1109/MNET.2009.5191144.

PCT International Preliminary Report on Patentability, mailed Jun. 7, 2012, in connection with International Application No. PCT/EP2010/067835.

PCT Written Opinion, dated Apr. 20, 2011, in connection with International Application No. PCT/EP2010/067835.

* cited by examiner

LEGEND

■ = GEOGRAPHIC AREA IN WHICH GIVEN CARRIER FREQUENCY IS BEING USED BY LICENSED USER; THE REST IS LICENSED BUT UNUSED "WHITE SPACE"

SENSING WIRELESS TRANSMISSIONS FROM A USER OF A SPECTRAL RESOURCE

BACKGROUND

The present invention relates to wireless communications, and more particularly to the sensing of wireless transmissions from a user of a spectral resource.

The radio spectrum is a limited resource that should be shared between many different types of equipment such as cellular, home network, broadcast, and military communication equipment. Historically, each part of the radio spectrum has been allocated to a certain use (called a "licensed" and/or "primary" use). This strategy has resulted in all applications/uses being disallowed on the allocated carrier frequency except for those applications included in the license agreement. In practice, this results in large parts of the radio spectrum being unused much of the time. For instance, in the Ultra-High Frequency (UHF) band, where TV broadcasts take place, large geographical areas are unused, mainly due to the large output power needed for such applications; this large output power compels a large reuse distance in order to minimize the risk of interference. An example of such geographical areas within Scandinavia is illustrated in FIG. 1. In FIG. 1, the shaded areas represent geographic locations in which a given carrier frequency is being used by a licensed user (e.g., by Broadcast TV). In the remaining areas, the so-called "white spaces", the given carrier frequency is allocated to the licensed user but is not actually being used by that user.

In order to make better use of the licensed spectral resources, some countries will, in the future, allow unlicensed services (so called "secondary" uses) to take place in areas (called "white spaces") in which the licensed (primary) user is not transmitting. However the primary user will always have priority for the use of the spectrum to the exclusion of others. Therefore, some kind of sensing mechanism is needed in the (unlicensed) devices to enable them to detect whether a licensed user is currently transmitting. If such licensed use is occurring, the unlicensed user needs to turn off its transmission on that carrier frequency. The most straightforward sensor is a signature detector adapted to detect specific signatures transmitted from the licensed/primary user (typically implemented as a matched filer).

Another consideration regarding the sensing of the licensed user's transmissions is placement of the sensors. When the secondary (i.e., unlicensed) use is for cellular telecommunications, one solution is to include the sensors in the base station of the mobile communication system. However due to shadow fading and the like, there is a risk that the base station will not detect the primary user's transmissions despite the fact that a mobile device/terminal (generally referred to as "user equipment"—"UE") (connected to the base station) is (or is capable of) interfering with the licensed user. One way to combat this problem is to include a sensing device in all UEs operating on these white space carriers; that is, all UEs can detect licensed use of the spectral resources and respond by turning off their own unlicensed transmissions.

A main problem with having the UEs perform sensing relates to the fact that sensing parameters may change after the UE has been manufactured. Such sensing parameters include, but are not limited to, such aspects as how sensitive the UE's sensing needs to be, how the licensed data traffic has been defined, and which frequency intervals are of interest in the analysis.

Yet another problem is that, even if the demands and/or definitions were known at the time of manufacturing, it might still be too computationally intensive for the UE to perform the functions necessary for sensing (i.e., sensing may require too much processing from its maximum processing capacity and/or may require too much expenditure from its battery and/or heat budget.

Therefore, there is a need for systems capable of operating in white spaces in an efficient manner that seeks to reduce the cost (in terms of energy and otherwise) and complexity involved in such unlicensed operation, while still having good performance in connection with detection of potential transmissions of the primary user even in the face of changing sensing requirements.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses that sense wireless transmissions from a user of a spectral resource. The user can be, but is not required to be, a licensed user of the spectral resource. Such operation includes operating receiver equipment within a user equipment to receive signals within a given bandwidth around a given carrier frequency. The user equipment ascertains whether it is readily capable of analyzing the received signals to ascertain whether a signature pattern of the user is present in the received signals. If not, it works cooperatively with a remote unit to analyze the received signals to ascertain whether a signature pattern of the user is present in the received signals. The results of the analysis are then reported to a main node.

In some embodiments, working cooperatively with the remote unit includes ascertaining that the user equipment would be capable of analyzing the received signals to ascertain whether the signature pattern of the user is present in the received signals but for a lack of application software and/or information. Inn response to this, the user equipment requests the application software and/or information from the remote unit. The application software and/or information is subsequently received from the remote unit. Then, the received application software and/or information is used by the user equipment to at least partly analyze the received signals to ascertain whether the signature pattern of the user is present in the received signals.

In some embodiments, working cooperatively with the remote unit includes communicating a representation of the received signals (e.g., raw or processed signals) to the remote unit for the purpose of obtaining at least partly analyzed results relating to whether the signature pattern of the user is present in the received signals. The user equipment then subsequently receives, from the remote unit, the at least partly analyzed results relating to whether the signature pattern of the user is present in the received signals.

In some embodiments, the remote unit supplies application software and/or information to the user equipment, which can then at least partly analyze the signal, and the remote unit also performs some of the analysis itself, with the results of that analysis being returned to the user equipment.

In another aspect, the above-referenced operation is performed by a user equipment in a mobile communication system that is not licensed to use the spectral resource; the main node is a base station in the mobile communication equipment; and the remote unit is in direct communication with the user equipment.

In yet another aspect, the method is performed by a user equipment in a mobile communication system that is not licensed to use the spectral resource; and the user equipment initiates performance of the method in response to a sensing order received from a base station operating in the mobile communication system. The sensing order includes, in some embodiments, a frequency and a bandwidth to be sensed by the user equipment. In some embodiments, the sensing order further includes a minimum signal level that serves as a threshold above which the user is considered to be transmitting the wireless transmissions by means of the spectral resource.

BRIEF DESCRIPTION OF THE DRAWINGS

The objects and advantages of the invention will be understood by reading the following detailed description in conjunction with the drawings in which.

DETAILED DESCRIPTION

Figure 1:
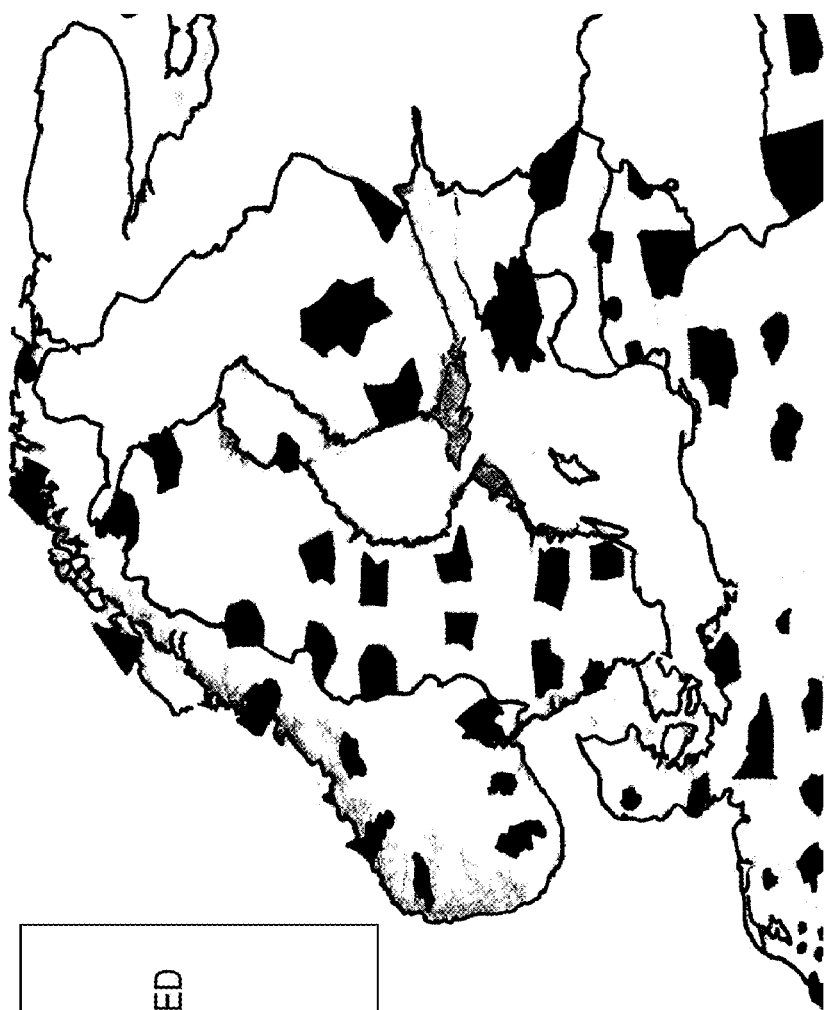
FIG. 1 illustrates geographical areas constituting so-called "white spaces" located in Scandinavia.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

In an aspect of embodiments consistent with the invention, a UE (e.g., at a self-determined time or in response to an order from a main node such as a base station) performs sensing on a certain frequency band. In some embodiments, the UE has downloaded a sensing application (i.e., software) from a remote unit, which enables the UE to analyze the sensed signal and determine for itself whether transmissions from a licensed user have been detected. In other embodiments, the UE receives the sensed signal from the frequency band of interest and stores it (e.g., in a baseband format). The stored signal sequence is then encoded and transmitted to a remote unit (e.g., the base station/main node or some other unit) that performs at least part of the sensing analysis. Then, the result of the sensing analysis is communicated back to the UE, which then performs any necessary remaining analysis and, based on the outcome, decides whether transmissions from a licensed user are present in the analyzed frequency band. A corresponding action can then be taken, depending on the outcome.

In still other embodiments, the two approaches described above are combined into a single unit, with the UE making a decision regarding whether it is capable of performing the analysis itself. If the answer is "yes", then it downloads the sensing application from the remote unit and performs the analysis. If the answer is "no", then the UE sends an encoded version of the sensed signal to a remote unit which, as described above, performs the analysis and returns the results to the UE. The decision regarding whether the UE is capable of performing the analysis itself may, for example, be based on which licensed user it is searching for. The identity or other indicia related to the licensed user can be provided to the UE by the mobile communication network. The UE then ascertains, for example by accessing a locally stored table, whether it is capable of performing the requested sensing internally (i.e., itself) or whether it needs help. The stored table contains information about which signals the UE is capable of analyzing.

Figure 2:
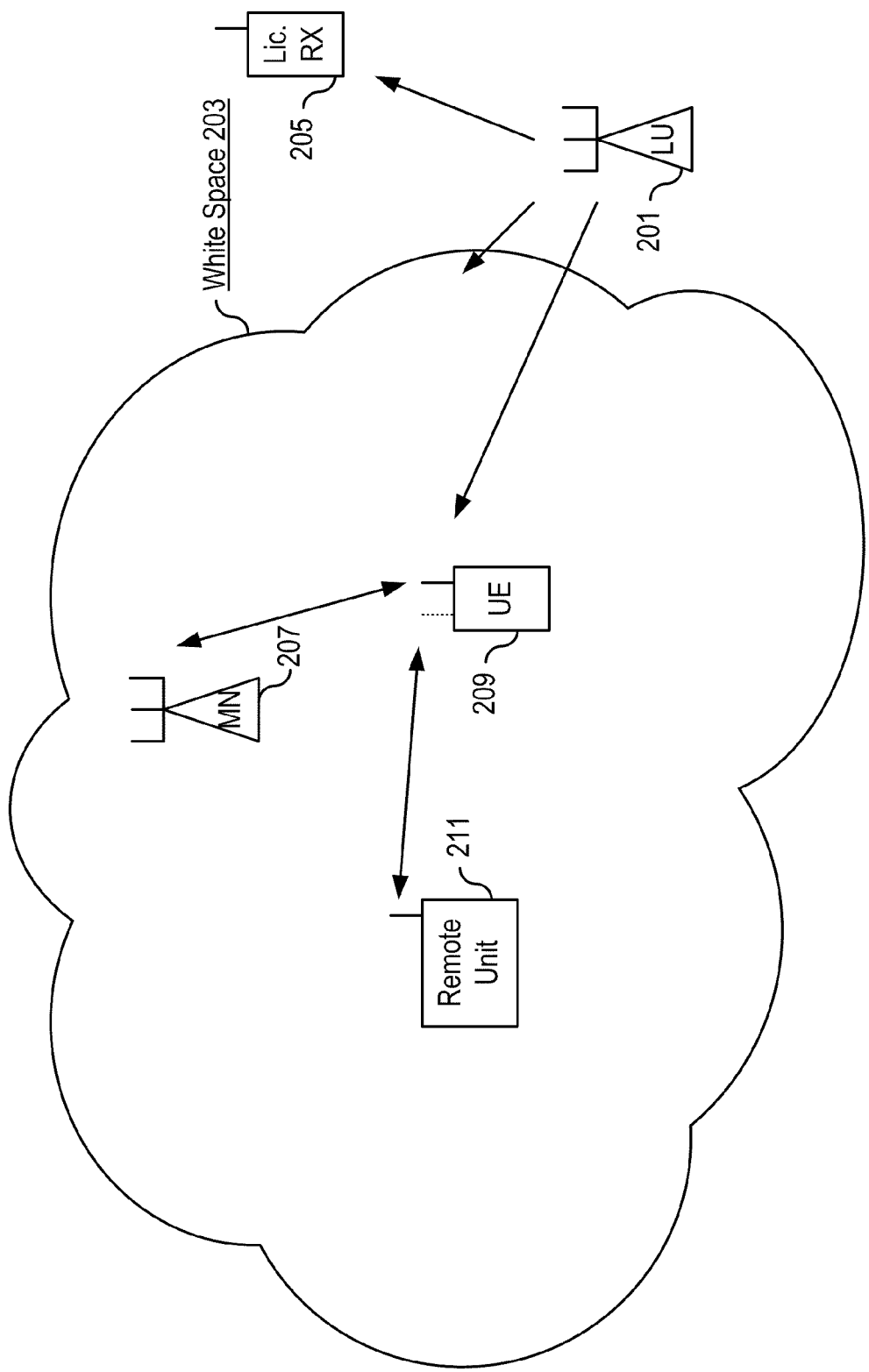
FIG. 2 is a block diagram of an exemplary system capable of carrying out various aspects of the invention.
Figure 3:
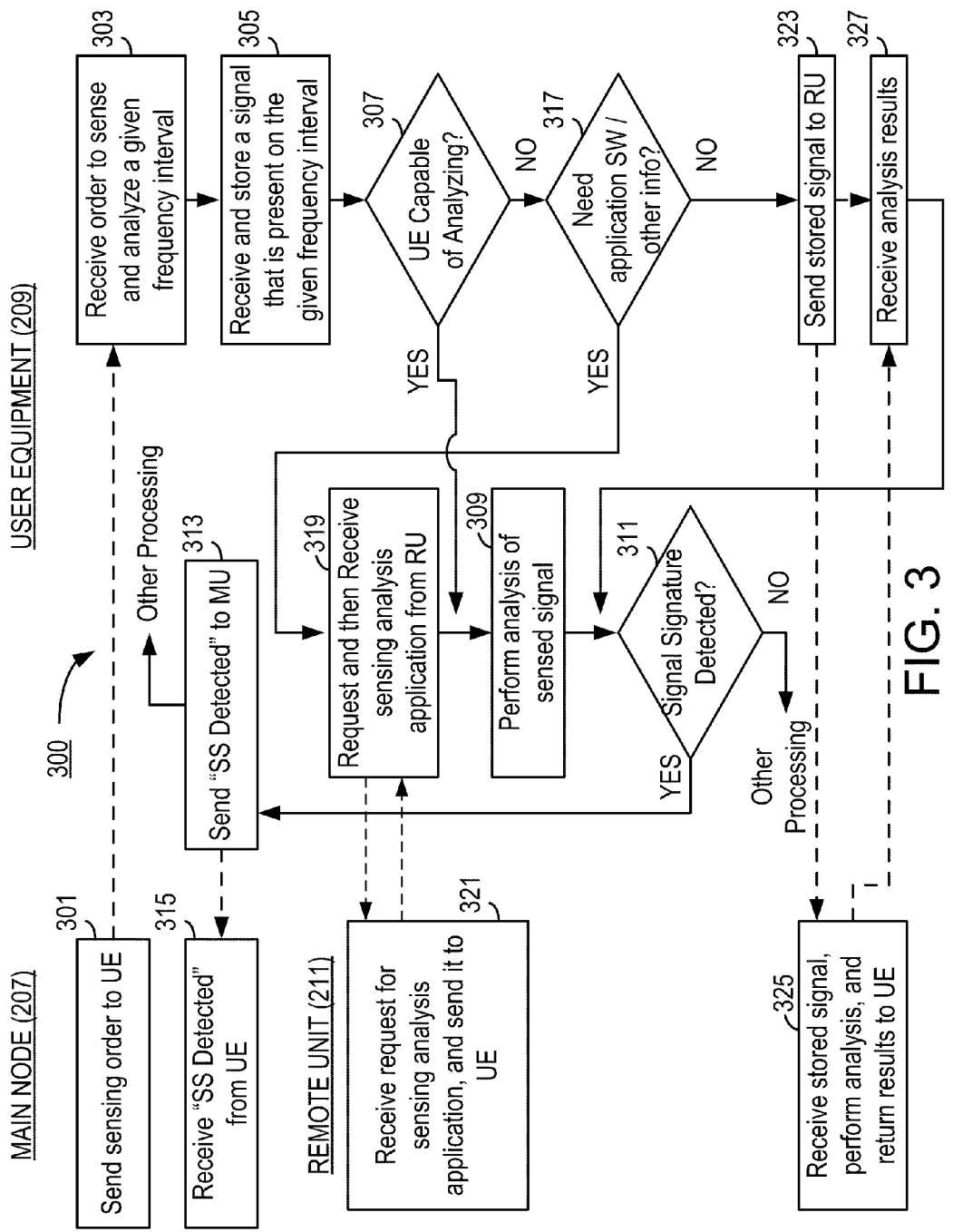
FIG. 3 is, in one respect, a flow chart of steps/processes/functions, carried out by an exemplary UE consistent with the invention.

Beginning first with FIGS. 2 and 3, FIG. 2 is a block diagram of an exemplary system capable of carrying out various aspects of the invention and FIG. 3 is, in one respect, a flow chart of steps/processes/functions, carried out by an exemplary UE consistent with the invention. In another respect, FIG. 3 can be considered to depict the various elements of logic 300 configured to carry out the various functions described in FIG. 3 and its supporting text.

In FIG. 2, a licensed user (LU) 201 is depicted operating within a geographic area that includes a white space 203. The licensed user 201 transmits a signal intended to be received by, for example, a licensed receiver 205. Although, for the sake of simplicity, only one licensed receiver 205 is shown in FIG. 2, in practice there may be any number of licensed receivers, each intending to receive the signal transmitted by the licensed user 201.

A mobile communication system is configured in accordance with various aspects of the invention to permit it to operate as an unlicensed user within the white space 203. The mobile communication system includes a base station 207 that serves one or more UEs, including a UE 209. In the context of the invention, the base station 207 exemplifies a "main node." In other embodiments different equipment constitutes the "main node." For example, in WLAN systems, a router can operate as a main node in the context of the invention.

The UE 209 includes circuitry configured to periodically sense whether the licensed user 201 is transmitting within the white space 203, and moreover to either download, from a remote unit 211, software and/or other information necessary for analyzing sensed signals in the event that the UE 209 is capable of performing this task but for the lack of the software and/or other information, or alternatively to send some form of the sensed radio energy in the frequency band of interest to the remote unit 211, which then performs the analysis on behalf of the UE 209. In FIG. 2, a second antenna associated with the UE 209 is depicted as a dotted line to show that the UE 209 may optionally have a dedicated communication link for communicating with the remote unit 211. In alternative embodiments, the UE 209 uses the same communication means as are used for communicating with the base station 207. Other alternatives are possible as well since, in the context of the invention, a "remote unit" could be embodied as any equipment other than the UE itself. To take another non-limiting example, a remote unit could be a hub that the UE first contacts by means of a Base Transceiver Station. This hub could then connects (e.g., via a wired or wireless connection) to a server located on the Internet.

In these and all other embodiments, the equipment functioning as the "remote unit" operates as described herein.

For the sake of simplicity, only a single remote unit 211 is shown and described in FIG. 2 in connection with the two different functions (i.e., software/information download to UE and/or processing of a received signal on behalf of the UE 209). While such dual-function circuitry is certainly a possibility in some embodiments, in alternative embodiments there may be separate remote units, each dedicated to performing a respective one of the tasks.

Referring now to FIG. 3, functions and the circuitry by which they are performed are shown. The UE 209 is connected to the base station 207 (main node) and is ordered by the base station 207 to perform sensing at a certain carrier frequency for a signal having a certain bandwidth (BW) (or carrier frequencies and bandwidths in case non-contiguous frequency bands are to be sensed) (step 301). The sensing order can expressly identify the carrier frequency and bandwidth to be sensed, or alternatively the UE 209 can be pre-programmed to already have this information available from a local source. The sensing order can further include a minimum signal level that the UE 209 (or the circuitry 300 included within a UE consistent with embodiments of the invention) will use as a threshold above which a detected signal is considered to be a transmission from the licensed user; below this threshold, the UE's operation is not considered to interfere with a licensed user. The sensing that the UE is ordered to perform can be at the same carrier frequency and bandwidth as a signal that it receives from/transmits to the base station 207, but this is not a requirement. The sensing order can, but does not necessarily have to, include a measurement sampling interval to be used when sensing. Still other information that the sensing order can, but does not necessarily have to, include is some sort of indicator of which signal signature to search for, or a reference to a communication standard that defines for the UE which signal signature to search for. In short, the various pieces of information that will influence the UE 209's sensing operation can be obtained by the UE 209 in any of a number of ways, such as by asking a database, which can be pre-stored locally within the UE 209 or can be stored within the UE 209 after an update from the main node. Such an update can either be broadcasted to all UEs in the vicinity, or alternatively can be directed to the UE 209 by means of dedicated signaling.

The UE 209 receives the sensing order (step 303) and, in response thereto, the UE 209 receives signals in the frequency interval/intervals of interest (i.e., as specified by the sensing order) using an antenna and a radio receiver (step 305). The signal energy received in this operation can be stored for later analysis and/or processing.

The antenna and radio receiver used for sensing may be an integral part of the UE 209. However, this is not a requirement. For example, in some embodiments, the UE 209 may only be expected to perform sensing when it is located in a "hot spot" at which antenna and receiver components can be shared via, for example, Bluetooth® personal area network communication equipment or the like. For a Frequency Division Duplex (FDD) system, there is really no need for a UE to be able to receive at frequencies that it uses for transmission only so such a shared outer device could be a valuable feature.

In an aspect of embodiments consistent with the invention, the UE ascertains whether it is readily capable of analyzing the sensed signal (decision block 307). As used herein, the term "readily capable" means "capable of performing the indicated function without any further modification of hardware or provisioning of new or additional software or other information." The answer may be "no" for any of a number of reasons. For example, the UE may not possess the latest version of a sensing/analysis application necessary to perform the task. Or, information needed to perform the analysis of the sensed signal (e.g., the signature of a signal being transmitted by the licensed user 201) may have changed since the UE was manufactured or last performed the analysis. Still another possibility is that there may not be enough processing power within the UE to perform the necessary analysis of the received signal. The enumeration of these few possibilities is intended to serve merely as an example, and is not intended to limit the scope of the invention.

If the UE is readily capable of analyzing the sensed signal ("YES" path out of decision block 307), then it performs the analysis of the sensed signal (step 309). The results of the analysis are then tested to ascertain whether a signature of a licensed user was detected (decision block 311). If it was ("YES" path out of decision block 311), then an indication is sent back to the main node, informing that a signal signature ("SS") was detected (step 313). The main node receives the indication and proceeds accordingly (step 315).

In alternative embodiments, the UE, upon ascertaining that the signal signature was detected, may itself decide whether to use the sensed frequency band, and the main node is merely informed of the decision.

Returning to the discussion of decision block 307, if the UE is not readily capable of analyzing the sensed signal ("NO" path out of decision block 307) then it is ascertained whether the provision of application software and/or or other information would be sufficient to make the UE readily capable of analyzing the sensed signal (decision block 317). If the answer is "yes" ("YES" path out of decision block 317), then the UE sends a request to a remote unit for it to download the required application software and/or other information (step 319). The remote unit receives the request, and downloads the requested application software and/or other information to the UE (step 321).

The UE, upon receiving the requested application software and/or other information from the remote unit, then proceeds to (at least in part) analyze the sensed signal (step 309) and perform further processing as described above.

Returning to the discussion of decision block 317, if the UE could not be made capable of performing the required analysis of the sensed signal ("NO" path out of decision block 317), then it sends the stored signal (either "raw" or in some way processed) to a remote unit in order to offload (at least part of) this work (step 323). Any type of known transmission method can be used for this communication.

The remote unit receives the signal, performs the requested analysis of it, and then returns the results back to the UE (step 325). The UE receives the results of the remote unit's analysis (step 327) and then proceeds directly to determining whether a signal signature was detected in the sensed signal (decision block 311). Further processing proceeds as described above.

Figure 4:
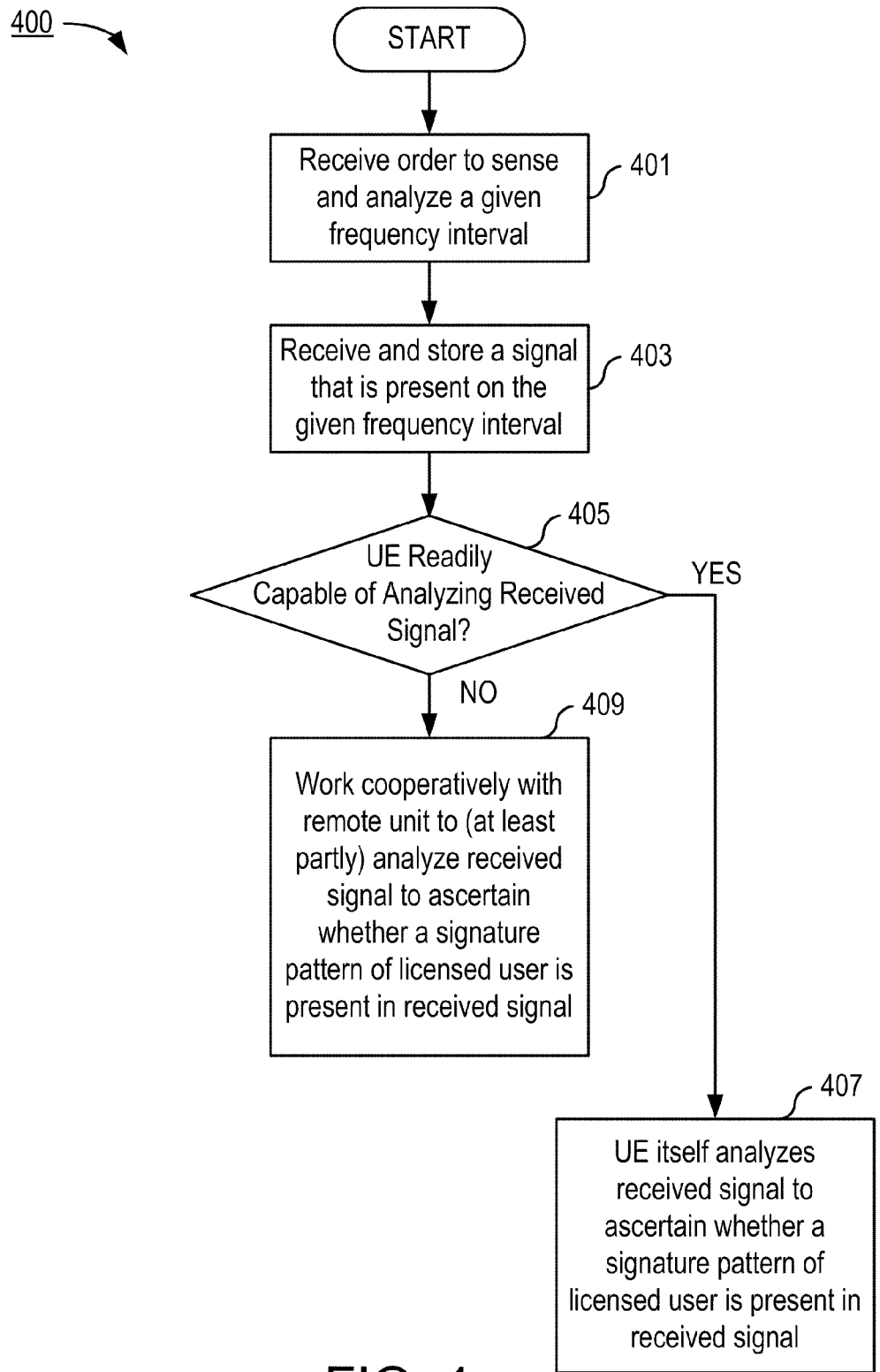
FIG. 4 is, in one respect, a flow chart of steps/processes/functions, carried out by an exemplary UE consistent with the invention.

To further illustrate concepts present in embodiments that are consistent with the invention, another figure will be discussed. FIG. 4 is, in one respect, a flow chart of steps/processes/functions, carried out by an exemplary UE consistent with the invention. In another respect, FIG. 4 can be considered to depict the various elements of logic 400 configured to carry out the various functions described in FIG. 4 and its supporting text.

The illustrated embodiment begins by the UE receiving a sensing order (step 401) from a main node and, in response thereto, the UE receiving signals in the frequency interval/intervals of interest (i.e., as specified by the sensing order) using an antenna and a radio receiver (step 403). The signal energy received in this operation can be stored for later analysis and/or processing.

The UE then ascertains whether it is readily capable of itself fully analyzing the received signals to ascertain whether a signature pattern of the licensed user is present in the received signals (decision block 405). If it is ("YES" path out of decision block 405), the UE circuitry performs the analysis itself (step 407).

However, if for some reason, the UE is not readily capable of itself fully analyzing the received signals to ascertain whether the signature pattern of the licensed user is present in the received signals ("NO" path out of decision block 405), the UE responds by working cooperatively with a remote unit to analyze the received signals to ascertain whether a signature pattern of the licensed user is present in the received signals (step 409). In some embodiments, this may mean working with the remote unit to obtain necessary software and/or other information to make the UE readily capable of performing the desired analysis. In other embodiments, this may mean sending a representation of the received signal (either "raw" or in some way processed) to the remote unit, which performs the desired analysis and returns the results.

In yet other embodiments, both aspects may be used. That is, a remote unit may be consulted to supply application software and/or information that makes the UE capable of at least partly analyzing the signal, and then the same or a different remote unit is consulted to perform the rest of the analysis, the results of which are returned to the UE.

In still other embodiments, the UE is, at the outset, capable of partly analyzing the signal, and so it does this. The partial results of the analysis are then communicated to a remote unit which completes the analysis and returns the results to the UE.

In yet other embodiments, a remote unit is used to partially analyze the signal, and the partial results are returned to the UE which then completes the analysis.

Those of ordinary skill in the art will recognize from the above description that there are many combinations of cooperation that are possible between the UE and the remote unit, and all of these are intended to be within the scope of the invention.

Figure 5:
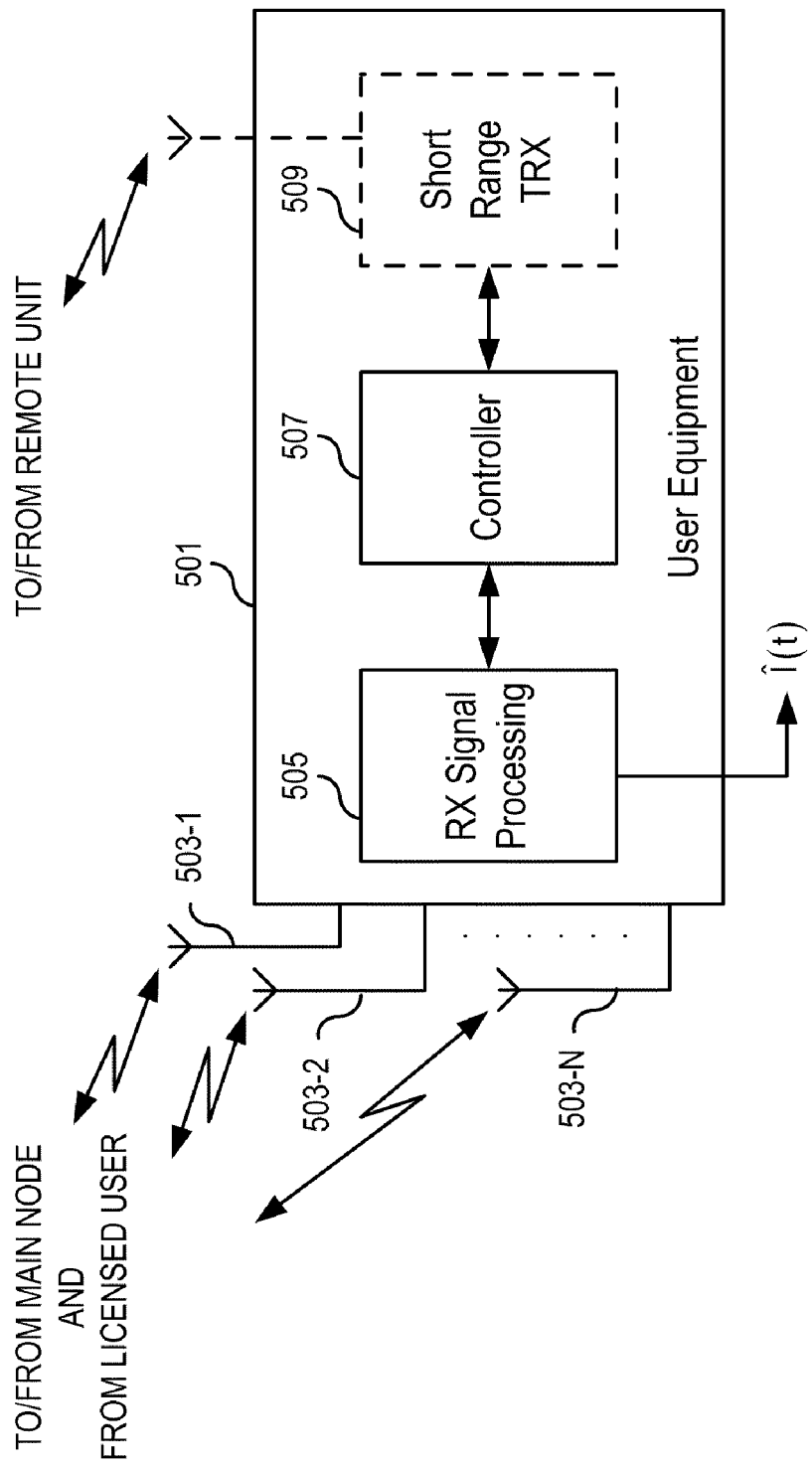
FIG. 5 is a block diagram of a UE adapted with circuitry configured to carry out the various aspects of the invention.

FIG. 5 is a block diagram of a UE 501 adapted with circuitry configured to carry out the various aspects of the invention. For the sake of clarity, only those components having particular relevance to the invention are depicted. Those of ordinary skill in the art will readily understand that the UE 501 also includes other circuitry (not depicted) that is well-known in the art and therefore need not be described herein.

In this example, the UE 501 employs so-called multiple-input, multiple-output (MIMO) communication technology. MIMO systems employ multiple antennas at the transmitter and receiver (e.g., the UE's antennas 503-1, 503-2, ..., 503-N) to transmit and receive information. The receiver can exploit the spatial dimensions of the signal at the receiver to achieve higher spectral efficiency and higher data rates without increasing bandwidth. However, the use of MIMO communication technology is by no means essential the invention; in alternative embodiments, the UE 501 could employ just a single antenna.

The base station (main node) (not shown) communicates with the UE 501 via a multipath channel. In downlink transmissions, an information signal, I(t), (e.g., in the form of a binary data stream) is supplied to the base station, which applies such processes as error coding, mapping the input bits to complex modulation symbols, and generating transmit signals for each of one or more transmit antennas. After upward frequency conversion, filtering, and amplification, the base station transmits the transmit signals from its one or more transmit antennas through the channel to the UE 501.

Receiver equipment in the UE 501 demodulates and decodes the signal received at each of its antennas 503-1, 503-2, ..., 503-N. The UE 501 includes a controller 507 for controlling operation of various UE components, including receiver signal processing circuitry 505. The receiver signal processing circuitry 505 demodulates and decodes the signal transmitted from the base station. In the absence of bit errors, the output signal from the UE 501, $\hat{I}(t)$, will be the same as the original information signal I(t).

The controller 507 is further configured to cause the UE 501 to carry out processes such as those exemplified by the UE-related steps shown in either of FIGS. 3 and 4. As mentioned earlier, the UE 501 can include (but does not in all embodiments) short range transceiver (TRX) equipment 509 to enable it to communicate with one or more remote units. The short range TRX equipment 509 can operate in accordance with any of a number of known short range communication technologies, such as Bluetooth® communication equipment, WLAN equipment, and the like.

Various embodiments of the invention are able to improve upon unlicensed operation of communication equipment in an area allocated for use by a licensed user in that the UE's sensing operations (i.e., to determine whether the licensed user is presently using licensed spectral resources) is simplified. This can include any combination of:

downloading the sensing algorithms and/or other information from a remote unit, where the sensing algorithms and/or other information render the UE capable of analyzing a sensed signal to detect the presence of a signal signature associated with a licensed user;

letting a remote unit do at least parts of the analysis required to detect the presence of a signal signature in a detected signal.

The UE sensing requirements in white space applications are thereby made easier and more flexible, which in turn leads to lower cost and other benefits relating to white space sensing in the UE.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of sensing wireless transmissions from a user of a spectral resource, the method comprising:
   operating receiver equipment within a user equipment to receive signals within a given bandwidth around a given carrier frequency;
   ascertaining whether the user equipment is readily capable of analyzing the received signals to ascertain whether a signature pattern of the user is present in the received signals;
   in response to ascertaining that the user equipment is not readily capable of analyzing the received signals to ascertain whether the signature pattern of the user is present in the received signals, performing:
      working cooperatively with a remote unit to analyze the received signals to ascertain whether the signature pattern of the user is present in the received signals; and
      reporting results of the analysis to a main node,
   wherein working cooperatively with the remote unit to analyze the received signals to ascertain whether the signature pattern of the user is present in the received signals comprises:
   communicating a representation of the received signals to the remote unit for the purpose of obtaining at least partly analyzed results relating to whether the signature pattern of the user is present in the received signals.

2. The method of claim 1, wherein working cooperatively with the remote unit to analyze the received signals to ascertain whether the signature pattern of the user is present in the received signals comprises:
   receiving, from the remote unit, the at least partly analyzed results relating to whether the signature pattern of the user is present in the received signals.

3. The method of claim 2, comprising:
   ascertaining whether the user equipment would be capable of analyzing the received signals to ascertain whether the signature pattern of the user is present in the received signals but for a lack of application software and/or information,
   wherein the step of communicating the representation of the received signals to the remote unit for the purpose of obtaining at least partly analyzed results relating to whether the signature pattern of the user is present in the received signals is performed only in response to ascertaining that the user equipment cannot be made capable of analyzing the received signals to ascertain whether the signature pattern of the user is present in the received signals by means of installing new application software and/or information.

4. The method of claim 3, comprising:
   in response to ascertaining that the user equipment would be capable of analyzing the received signals to ascertain whether the signature pattern of the user is present in the received signals but for the lack of application software and/or information, requesting the application software and/or information from the remote unit;
   receiving the application software and/or information from the remote unit; and
   using the received application software and/or information to at least partly analyze the received signals to ascertain whether the signature pattern of the user is present in the received signals.

5. The method of claim 1, wherein:
   the method is performed by a user equipment in a mobile communication system;
   the main node is a base station in the mobile communication equipment; and
   the remote unit is in direct communication with the user equipment.

6. The method of claim 1, wherein:
   the method is performed by a user equipment in a mobile communication system; and
   the user equipment initiates performance of the method in response to a sensing order received from a base station operating in the mobile communication system.

7. The method of claim 6, wherein the sensing order includes at least one of the following:
   a frequency and a bandwidth to be sensed by the user equipment;
   a minimum signal level that serves as a threshold above which the user is considered to be transmitting the wireless transmissions by means of the spectral resource; and
   a signal signature to be searched for by the user equipment; and
   an indicator of a signal signature to be searched for by the user equipment.

8. A method of sensing wireless transmissions from a user of a spectral resource, the method comprising:
   operating receiver equipment within a user equipment to receive signals within a given bandwidth around a given carrier frequency;
   ascertaining whether the user equipment is readily capable of analyzing the received signals to ascertain whether a signature pattern of the user is present in the received signals;
   in response to ascertaining that the user equipment is not readily capable of analyzing the received signals to ascertain whether the signature pattern of the user is present in the received signals, performing:
      working cooperatively with a remote unit to analyze the received signals to ascertain whether the signature pattern of the user is present in the received signals; and
      reporting results of the analysis to a main node,
   wherein working cooperatively with the remote unit to analyze the received signals to ascertain whether the signature pattern of the user is present in the received signals comprises:
   ascertaining that the user equipment would be capable of analyzing the received signals to ascertain whether the signature pattern of the user is present in the received signals but for a lack of application software and/or information;
   in response to said ascertaining, requesting the application software and/or information from the remote unit;
   receiving the application software and/or information from the remote unit; and
   using the received application software and/or information to at least partly analyze the received signals to ascertain whether the signature pattern of the user is present in the received signals.

9. The method of claim 8, wherein:
   the method is performed by a user equipment in a mobile communication system;
   the main node is a base station in the mobile communication equipment; and
   the remote unit is in direct communication with the user equipment.

10. The method of claim 8, wherein:
the method is performed by a user equipment in a mobile communication system; and
the user equipment initiates performance of the method in response to a sensing order received from a base station operating in the mobile communication system.

11. The method of claim 10, wherein the sensing order includes at least one of the following:
a frequency and a bandwidth to be sensed by the user equipment;
a minimum signal level that serves as a threshold above which the user is considered to be transmitting the wireless transmissions by means of the spectral resource; and
a signal signature to be searched for by the user equipment; and
an indicator of a signal signature to be searched for by the user equipment.

12. An apparatus for sensing wireless transmissions from a user of a spectral resource, the apparatus comprising:
circuitry configured to operate receiver equipment within a user equipment to receive signals within a given bandwidth around a given carrier frequency;
circuitry configured to ascertain whether the user equipment is readily capable of analyzing the received signals to ascertain whether a signature pattern of the user is present in the received signals;
circuitry configured to respond to ascertaining that the user equipment is not readily capable of analyzing the received signals to ascertain whether the signature pattern of the user is present in the received signals, by performing:
working cooperatively with a remote unit to analyze the received signals to ascertain whether the signature pattern of the user is present in the received signals; and
reporting results of the analysis to a main node,
wherein working cooperatively with the remote unit to analyze the received signals to ascertain whether the signature pattern of the user is present in the received signals comprises:
communicating a representation of the received signals to the remote unit for the purpose of obtaining at least partly analyzed results relating to whether the signature pattern of the user is present in the received signals.

13. The apparatus of claim 12, wherein working cooperatively with the remote unit to analyze the received signals to ascertain whether the signature pattern of the user is present in the received signals comprises:
receiving, from the remote unit, the at least partly analyzed results relating to whether the signature pattern of the user is present in the received signals.

14. The apparatus of claim 13, comprising:
circuitry configured to ascertain whether the user equipment would be capable of analyzing the received signals to ascertain whether the signature pattern of the user is present in the received signals but for a lack of application software and/or information,
wherein communicating the representation of the received signals to the remote unit for the purpose of obtaining at least partly analyzed results relating to whether the signature pattern of the user is present in the received signals is performed only in response to ascertaining that the user equipment cannot be made capable of analyzing the received signals to ascertain whether the signature pattern of the user is present in the received signals by means of installing new application software and/or information.

15. The apparatus of claim 14, comprising:
circuitry configured to request the application software and/or information from the remote unit in response to ascertaining that the user equipment would be capable of analyzing the received signals to ascertain whether the signature pattern of the user is present in the received signals but for the lack of application software and/or information;
circuitry configured to receive the application software and/or information from the remote unit; and
circuitry configured to use the received application software and/or information to at least partly analyze the received signals to ascertain whether the signature pattern of the user is present in the received signals.

16. The apparatus of claim 12, wherein:
the apparatus is part of a user equipment in a mobile communication system;
the main node is a base station in the mobile communication equipment; and
the remote unit is in direct communication with the user equipment.

17. The apparatus of claim 12, wherein:
the apparatus is part of a user equipment in a mobile communication system; and
the apparatus comprises circuitry configured to initiate operation in response to a sensing order received from a base station operating in the mobile communication system.

18. The apparatus of claim 17, wherein the sensing order includes at least one of the following:
a frequency and a bandwidth to be sensed by the user equipment;
a minimum signal level that serves as a threshold above which the user is considered to be transmitting the wireless transmissions by means of the spectral resource; and
a signal signature to be searched for by the user equipment; and
an indicator of a signal signature to be searched for by the user equipment.

19. An apparatus for sensing wireless transmissions from a user of a spectral resource, the apparatus comprising:
circuitry configured to operate receiver equipment within a user equipment to receive signals within a given bandwidth around a given carrier frequency;
circuitry configured to ascertain whether the user equipment is readily capable of analyzing the received signals to ascertain whether a signature pattern of the user is present in the received signals;
circuitry configured to respond to ascertaining that the user equipment is not readily capable of analyzing the received signals to ascertain whether the signature pattern of the user is present in the received signals, by performing:
working cooperatively with a remote unit to analyze the received signals to ascertain whether the signature pattern of the user is present in the received signals; and
reporting results of the analysis to a main node,
wherein working cooperatively with the remote unit to analyze the received signals to ascertain whether the signature pattern of the user is present in the received signals comprises:
ascertaining that the user equipment would be capable of analyzing the received signals to ascertain whether the signature pattern of the user is present in the received signals but for a lack of application software and/or information;

in response to said ascertaining, requesting the application software and/or information from the remote unit;

receiving the application software and/or information from the remote unit; and using the received application software and/or information to at least partly analyze the received signals to ascertain whether the signature pattern of the user is present in the received signals.

20. The apparatus of claim 19, wherein:

the apparatus is part of a user equipment in a mobile communication system;

the main node is a base station in the mobile communication equipment; and the remote unit is in direct communication with the user equipment.

21. The apparatus of claim 19, wherein:

the apparatus is part of a user equipment in a mobile communication system; and the apparatus comprises circuitry configured to initiate operation in response to a sensing order received from a base station operating in the mobile communication system.

22. The apparatus of claim 21, wherein the sensing order includes at least one of the following:

a frequency and a bandwidth to be sensed by the user equipment;

a minimum signal level that serves as a threshold above which the user is considered to be transmitting the wireless transmissions by means of the spectral resource; and a signal signature to be searched for by the user equipment; and an indicator of a signal signature to be searched for by the user equipment.

* * * * *